(12) United States Patent
Giamei et al.

(10) Patent No.: US 6,671,794 B1
(45) Date of Patent: Dec. 30, 2003

(54) ADDRESS GENERATION INTERLOCK DETECTION

(75) Inventors: Bruce C. Giamei, Poughkeepsie, NY (US); Mark A. Check, Hopewell Junction, NY (US); John S. Liptay, Rhinebeck, NY (US)

(73) Assignee: International Business Machines Corporation, Armonk, NY (US)

( * ) Notice: Subject to any disclaimer, the term of this patent is extended or adjusted under 35 U.S.C. 154(b) by 640 days.

(21) Appl. No.: 09/678,226

(22) Filed: Oct. 2, 2000

(51) Int. Cl.[7] .............................. G06F 9/38; G06F 12/16
(52) U.S. Cl. ........................................ 712/217; 712/216
(58) Field of Search ................................. 712/216, 217

(56) References Cited

U.S. PATENT DOCUMENTS

| | | | |
|---|---|---|---|
| 4,287,561 A | | 9/1981 | Liptay |
| 4,907,147 A | | 3/1990 | Saito et al. |
| 4,991,080 A | | 2/1991 | Emma et al. |
| 5,127,093 A | * | 6/1992 | Moore, Jr. .................. 712/217 |
| 5,416,911 A | | 5/1995 | Dinkjian et al. |
| 5,481,683 A | * | 1/1996 | Karim ......................... 712/217 |
| 5,787,303 A | | 7/1998 | Ishikawa |
| 5,790,821 A | * | 8/1998 | Pflum ......................... 712/200 |
| 6,016,540 A | * | 1/2000 | Zaidi et al. .................. 712/214 |
| 6,212,619 B1 | * | 4/2001 | Dhong et al. .................. 712/23 |
| 6,266,759 B1 | * | 7/2001 | Birrittella ....................... 712/5 |
| 6,308,259 B1 | * | 10/2001 | Witt ............................ 712/214 |
| 6,405,304 B1 | * | 6/2002 | Farrell et al. ................ 712/216 |

* cited by examiner

Primary Examiner—William M. Treat
(74) Attorney, Agent, or Firm—Lynn Augspurger; Cantor Colburn LLP (57) ABSTRACT

A method and system for detecting address generation interlock in a pipelined data processor is disclosed. The method comprises accumulating a plurality of vectors over a predefined number of processor clock cycles, with subsequent vectors corresponding to subsequent clock cycles; accumulating the status of one or more general registers in the plurality of vectors with the same bit location in each vector of the plurality of vectors corresponding to a particular general register; generating a list of pending general register updates from a logical combination of the plurality of vectors; and determining the existence of address generation interlock from the list of pending general register updates.

25 Claims, 6 Drawing Sheets

ADDRESS GENERATION INTERLOCK DETECTION

FIELD OF THE INVENTION

This disclosure relates to a method and system for the detection of address generation interlock in a pipelined processor.

BACKGROUND

Virtually all high-performance processors today are "pipelined." Most instructions have to go through the same basic sequence: first the instruction must be fetched, then it is decoded, then operands are fetched. Then the instruction must be executed and the results of the execution must be put away. Rather than wait for an instruction to progress through the entire sequence before starting the next instruction, most processor architectures are pipelined, whereby, once instruction m has been fetched and progresses to the decode stage, instruction m+1 is fetched. Then, instruction m progresses to the address generation stage, instruction m+1 advances to the decode stage and instruction m+2 is fetched. Thus, multiple instructions may be active at various stages of the pipeline at any one time. However, the flow of instructions into the pipeline may stall for many reasons. If, for example, instruction m modifies a register of which a subsequent instruction, say instruction m+2, needs to calculate the address of operands, instruction m+2 may proceed to the address generation stage, but must be held in there until instruction m finishes putting away its results (i.e., updating the register that instruction m+2 requires). Only then may instruction m+2 complete its address generation and continue in the pipeline. This stall in the flow of instructions into the pipeline is referred to as Address Generation Interlock (AGI).

If instructions are placed in a queue, between the Instruction-decode and execution stages and the I-decode stage is used to read general registers (GR's) in preparation for address generation (AGEN), AGI can be detected during the decode cycle by comparing the GR's required to pending GR update information from each and every appropriate instruction queue (I-queue) position. Instructions are removed from the I-queue following successful execution of the corresponding instruction.

Heretofore, this has been accomplished by saving, in each I-queue position, the first and last GR numbers defining a range of GR's to be updated by the corresponding instruction. As a new instruction is decoded, the GR's required for AGEN were compared to all pending GR update ranges within the I-queue. However, for each GR read, this required two N-bit comparators in a machine with $2^N$ GR's plus some combinatorial logic to fully define pending range followed by an Z input logical OR function, where Z is the number of I-queue positions. However, as the I-queue increases in size and as the machine cycle time is reduced, it is increasingly more difficult to implement this solution.

SUMMARY OF THE INVENTION

A method and system for detecting address generation interlock in a data processor having a pipeline in the form of a plurality of serially connected processing stages including an instruction decode stage, an address calculation stage following the decode stage, and an instruction execution stage following the address calculation stage, with each stage for processing an instruction where the pipeline shifts a series of instructions from stage to stage to perform pipeline processing on the series of instructions, and with the data processor including a set of N general registers which may be written to as a result of processing an instruction at the instruction execution stage in the pipeline or may be read from during the processing of an instruction at the address calculation stage in the pipeline is disclosed. The method comprises accumulating a plurality of vectors over a predefined number of processor clock cycles, with subsequent vectors corresponding to subsequent clock cycles; accumulating the status of one or more general registers in the plurality of vectors with the same bit location in each vector of the plurality of vectors corresponding to a particular general register; generating a list of pending general register updates from a logical combination of the plurality of vectors; and determining the existence of address generation interlock from the list of pending general register updates.

DETAILED DESCRIPTION OF THE INVENTION

To reduce cycle time pressure, it is desireable that pending GR update information for instructions in the I-queue, most of which will remain in the I-queue for at least another cycle, be accumulated in advance into a summary of pending GR updates. To do this, the I-queue field, used to save pending GR update information, may be changed in format from two N bit values to a single $2^N$ bit vector, where each bit indicates the corresponding GR to be updated. This permits several of these vectors to be logically OR'ed together to create a summary vector in advance. Since the summary vector is computed a cycle in advance, instructions being added to the I-queue from I-decode, or removed from the I-queue by execution, must be accounted for separately in a similar manner (two additional $2^N$ bit vectors may be used to track these instructions). As a result, AGI can be detected in the I-decode cycle by combining the three $2^N$ bit vectors into a single $2^N$ bit vector, identifying all pending GR's to be updated, and providing the result to a $2^N$:1 multiplexer which uses the GR read address for AGEN as the select line.

The AGEN cycle of an instruction effected by an AGI condition will be blocked. The effected instruction will remain in the address adder stage of the pipeline until all outstanding AGI conditions have been resolved. Information about an instruction which might cause an AGI condition is maintained in the I-queue. Part of the information saved for each instruction in the I-queue is a set of GR write flags. The write flags indicate which GRs or ARs a given instruction will update or write. The flags for each outstanding instruction are compared against the required GR reads of an instruction decoding. During decode, the GRs are being read for AGEN. If a GR read intersects with an outstanding GR update, then an AGI condition exists. The decode cycle of the interlocked instruction is permitted to complete successfully. The GR read(s) normally associated with decode are continually retried while the interlocked instruction waits for new GR contents of interest. During that time, the AGEN cycle of the interlocked instruction is considered blocked or unsuccessful. The instruction after the interlocked instruction is blocked from completing its decode cycle, even if it doesn't require an AGEN function. The actual decode cycle of the instruction delayed by AGI is permitted to finish and the address add (AA) cycle is delayed or repeated until successful. The delayed AA results in blocking further decode of future instructions even if future instructions do not require the address adder. More than one instruction in the I-queue can cause AGI conditions for an instruction currently decoding. If more than one interlock occurs, the AA cycle will be blocked until all outstanding AGI conditions are resolved.

The GR write flags (16 per instruction, one for each GR) are determined during an instruction's decode cycle. Once an instruction has been successfully decoded, it moves into the I-queue. Since the I-queue may be deep (expected to evolve into a deeper queue), it is too challenging to compare all I-queue positions against the instruction decoding. Therefore, all pending GR updates in the I-queue are summarized and placed into a 16 bit summary general register write vector. This alleviates a cycle time concern. For example, if bit 5 of the summary general register write vector=$1_b$, then an instruction exists in the I-queue which will update GR 5. In addition to updating the I-queue, new GR write flags must be able to bypass the I-queue AGI information and feed a decoded vector for an instruction to maintain its AGI coverage the cycle after its last decode cycle. To avoid detecting an AGI condition longer than appropriate, an instruction is moved from the AGI queue to an instruction execution list during its confirmed execution setup cycle ($E_0$). This is necessary due to an extra latch between the I-queue AGI information and the AGI detection logic.

Figure 3:
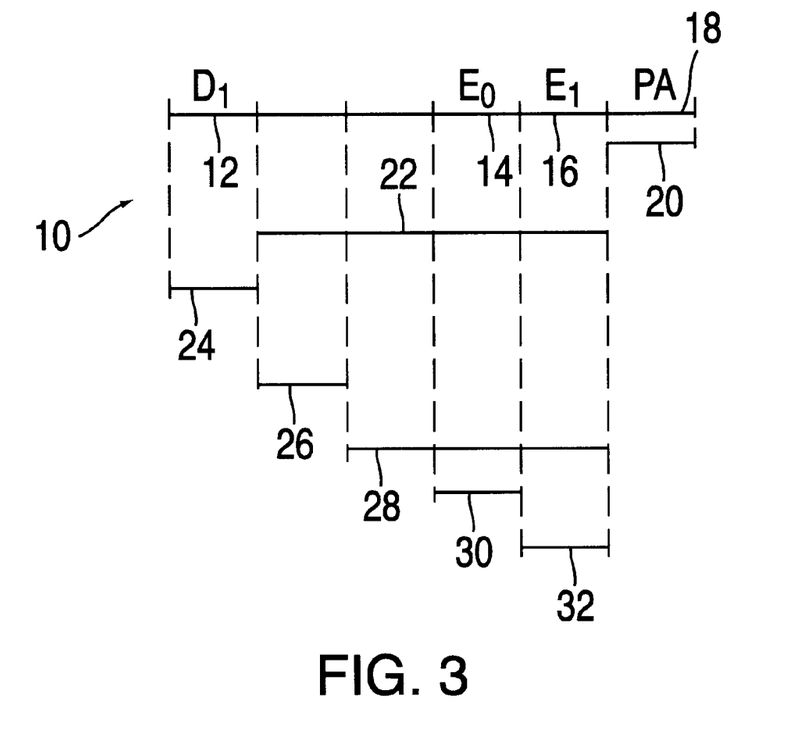
FIG. 3 is a timing diagram of an exemplary instruction with a single decode cycle and single execution cycle causing Address Generation Interlock.
Figure 4:
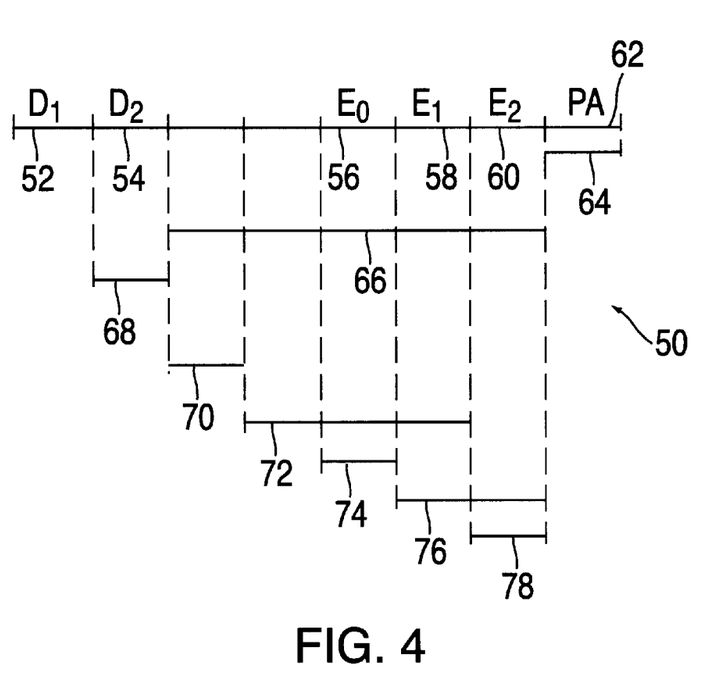
FIG. 4 is a timing diagram of an instruction with multiple decode cycles and multiple execution cycles causing Address Generation Interlock.
Figure 5:
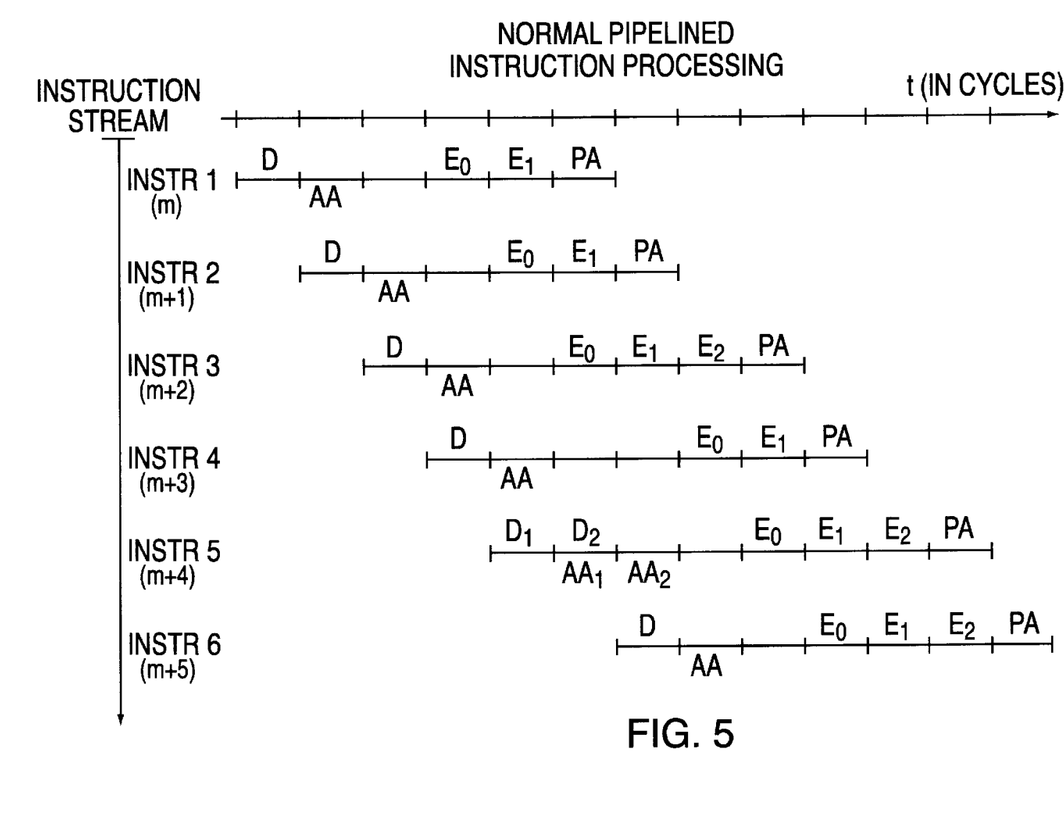
FIG. 5 is a general timing diagram of an instruction stream in a pipelined processor.

The AGI detection logic uses a general register base read address (base, B) and a general register index read address (index, X) field of the instruction decoding to select the appropriate bits of the pending GR write vectors to determine if an AGI condition exists. FIGS. 3 and 4 illustrate which cycles an instruction can cause an interlock and which piece of the data flow permits that detection in each cycle.

Figure 1:
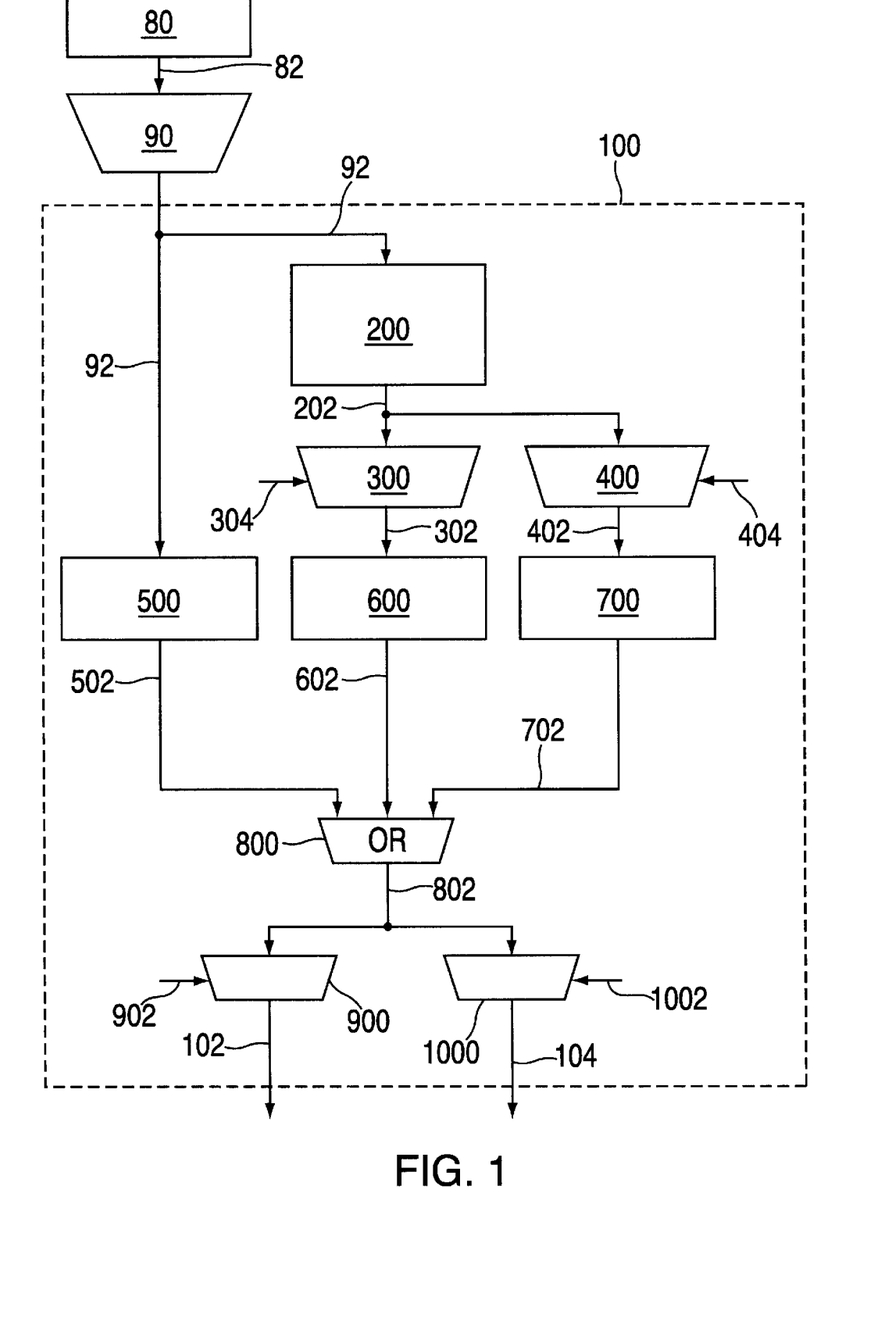
FIG. 1 is a generalized schematic diagram of the Address Generation Interlock detection dataflow of the present invention.

Referring to FIG. 1, the dataflow of the present invention is shown generally at 100. An Instruction register 80 provides as output an instruction 82 being decoded. An Instruction decode 90 provides as output a general register write vector 92 identifying which GR's are to be updated for the instruction being decoded. The general register write vector 92 is provided as input to an Address Generation Interlock Queue 200. The AGI-queue 200 is a list of instructions that may have pending GR updates. The Address Generation Interlock Queue 200 provides as output a set of GR write vectors corresponding to instructions which have been decoded and not yet begun execution. The output set of vectors 202 is provided as input to a Summarize function 300 and a Select function 400. In the Summarize function 300 each output vector 202 (AGI queue entry) is combined with a corresponding control signal 304 permitting the general register write vector to participate in computing a summary of the AGI information. The Summarize function 300 provides as output 302 pending general register updates of outstanding instructions decoded, but not yet executed. In the Select function 400 the output set of vectors 202 is combined with a control signal 404 which specifies which AGI Queue entry should be moved into the execution vector. The AGI Queue entry chosen corresponds to the instruction currently in the execution setup cycle, $E_0$. The Select function 400 provides as output a vector 402 corresponding to the instruction that is in the $E_0$ cycle.

The general register write vector 92 is also provided as input to a decoded vector 500, while the pending general register updates of outstanding instructions 302 is provided as input to a summary vector 600 and the output vector 402 corresponding to the instruction that is in the $E_0$ cycle is provided as input to a execution vector 700.

The decoded vector 500 provides as output a new general register write vector 502 indicative of pending GR updates for instructions recently decoded. The summary vector 600 provides as output a summary general register write vector 602 indicative of pending GR updates for instructions awaiting execution and the execution vector 700 provides as output an instruction execution list general register write vector 702 indicative of pending GR updates for instructions in the execution unit. The aforesaid vectors 502, 602, 702 are combined in a logical OR gate 800, which provides as output a trap vector 802 indicative of all pending GR updates. The trap vector 802 is provided as input to an n:1 multiplexer 900 where the trap vector 802 is combined with a general register base read address 902 to provide as output an unconditioned AGI detection against "base" 102. The trap vector 802 is also provided as input to an n:1 multiplexer 1000 where the trap vector 802 is combined with a general register index read address 1002 to provide as output an unconditioned AGI detection against "index" 104. n is the number of GR's.

Figure 2:
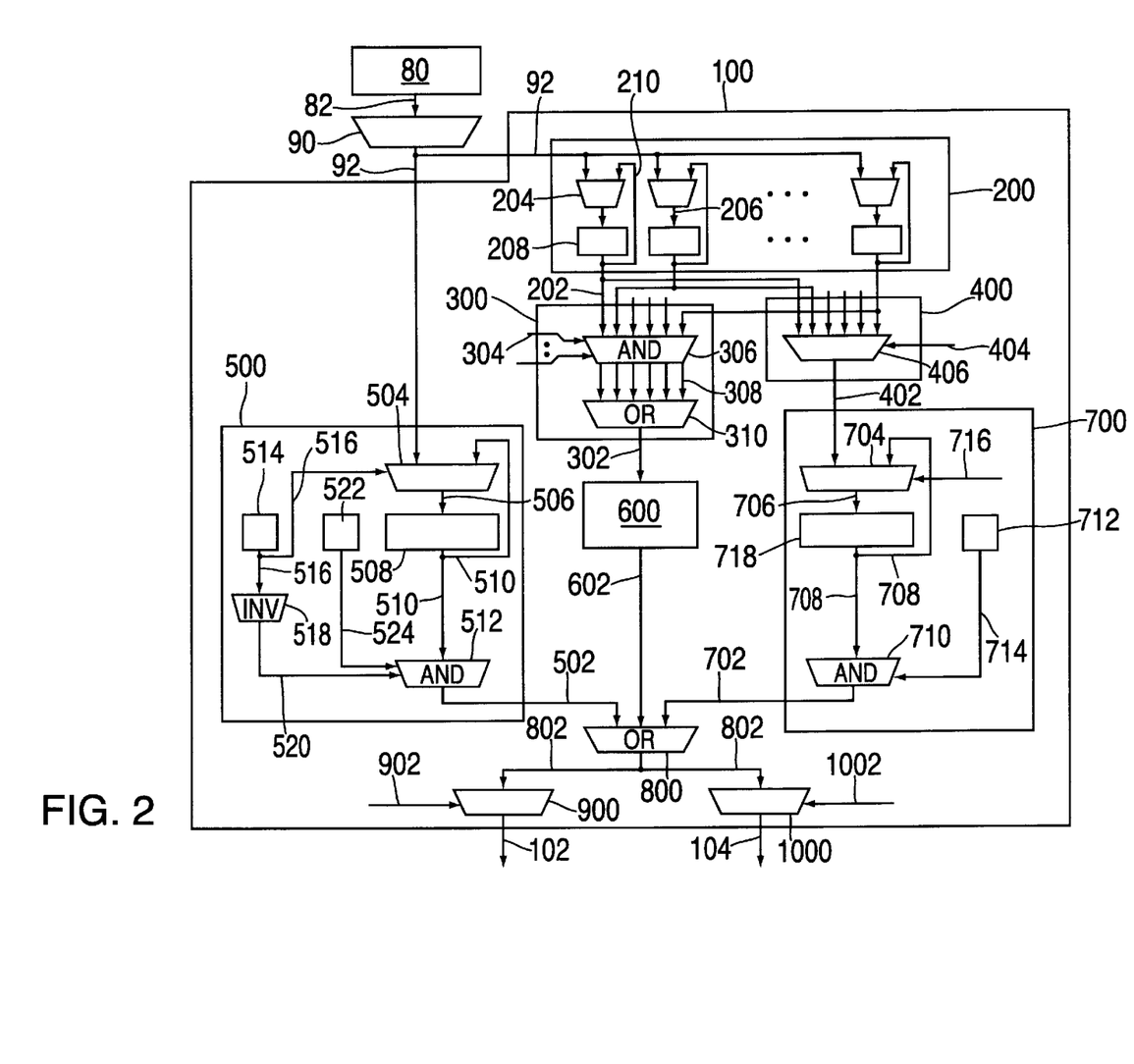
FIG. 2 is a more detailed schematic diagram of the Address Generation Interlock detection dataflow of FIG. 1.

Referring to FIG. 2, the AGI-queue 200 comprises a plurality of latches containing the AGI queue general register write vectors 208 (corresponding to instructions which have been decoded but not yet executed) in signal communication at 206 with a plurality of multiplexers 204. The plurality of multiplexers 204 accept as input the decode general register write vector 92 (identifying which general registers are to be updated for the instruction being decoded) and a feedback signal 210, i.e., the output of the AGI queue general register write vectors 208. The AGI queue general register write vectors 208 provide as output the instructions 202 decoded but not yet executed. The instructions 202 decoded but not yet executed are provided as input to the Summarize function 300 and the Select function 400.

The Summarize function 300 further accepts as input a plurality of control signals 304 permitting the general register write vectors 208, from the corresponding AGI-queue entry, to participate in computing a summary of AGI information. The signals 304 and the vectors 202 are combined in a logical AND gate 306 providing thereby as output a set of qualified vectors 308. The set of qualified vectors 308 are combined in a logical OR gate 310 providing thereby as output a signal 302 indicative of pending general register updates of outstanding instructions decoded but not yet executed. As mentioned above, the output signal 302, i.e., the pending general register updates of instructions decoded, but not yet executed, is provided to the Summary vector 600 which provides as output 602 the pending general register updates for instructions awaiting execution.

The Select function 400 comprises a multiplexer 406 operative to accept as input the vectors 202 corresponding to instructions decoded but not yet executed and the control signal 404 specifying which AGI-queue entry should be moved into the execution vector. The Select function thus provides as output the vector 402 corresponding to the instruction that is in the $E_0$ cycle.

The execution vector 700 comprises a latch containing the instruction execution list general register write vector 718 in signal communication at 706 with a multiplexer 704. The multiplexer 704 accepts as input the aforesaid vector 402, a feedback signal 708 from the output of the instruction execution list general register write vector 718 (corresponding to instructions in the execution stage of the pipeline) and an $E_0$ execution cycle confirmation 716. The output of the instruction execution list general register write vector 718 and a validation 714 of the instruction execution list general register write vector 718 are combined in a logical AND gate 710 providing thereby as output the pending general register updates for instructions in the execution unit 702.

The Decode vector 500 comprises a latch 508 in signal communication at 506 with a multiplexer 504. The multiplexer 504 accepts as input the decode general register write vector 92 (identifying which general registers are to be updated for the instruction being decoded), a new general register write vector 510 (corresponding to the last instruction successfully decoded) as a feedback signal from the output of the new general register write vector latch 508 and a signal 516 operative when AGI has been detected in the prior cycle so AGEN cannot be successful in the current cycle and the general registers must be reread. The new general register write vector latch 508 provides as output the new general register write vector 510. The signal 516 is inverted at 518 to provide a usage qualification 520 of the new general register write vector 510. A latch 522 provides a signal 524 validating the new general register write vector 510. The new general register write vector 510, the usage qualification 520 of the new general register write vector 510 and the signal 524 are combined in a logical AND gate 512 which provides as output a new AGI trap vector 502. The new AGI trap vector 502 is equal to the new general register write vector 510 when the general register write vector 510 needs to participate in the AGI detection, else it equals $0000_{16}$.

The new AGI trap vector 502 (pending general register updates for instructions recently decoded), the pending general register updates for instructions awaiting execution 602 and the instruction execution list general register write vector 702 are combined in a logical OR gate 800 to provide as output AGI trap vector 802 which is the list of all pending general register updates. The list of all pending general register updates 802 is combined in a multiplexer 900 with a general register base read address 902. The contents of the general register addressed by the base read address 902 will be used during AGEN as a base register. The base read address is determined during the Instruction decode. The output 102 of the multiplexer 900 is the AGI detection against base. The list of all pending general register updates 802 is also combined in a multiplexer 1000 with a general register index read address 1002. The contents of the general register index read address 1002 will be used during AGEN as an index register. The index read address is determined during the Instruction decode. The output 104 of the multiplexer 1000 is the AGI detection against index.

In FIG. 3 a timing diagram of a first exemplary instruction is shown generally at 10. The completion of the instruction requires six cycles, including a single decode cycle 12, an execution setup cycle 14 an execution cycle 16 and a put away cycle 18. AGI coverage is required at 22 from the cycle following the decode cycle 12 to the end of the last execution cycle 16 whereupon the GR's are updated at 20. During the decode cycle 12, the instruction updates of the GR's are determined at 24, the Instruction decode 90 feeds the decode vector 500 and the AGI queue 200. The instructions final decode cycle confirmation is made. After the decode cycle 12 AGI coverage is provided at 26 by the decode vector 500 and AGI queue 200 feeds the summary vector 600. After the previous AGI coverage 26, AGI is provided at 28 by the summary vector 600. During the execution setup cycle 14, the AGI queue 200 feeds the execution vector 700. After the execution setup cycle 14, AGI coverage is provided at 32 by the execution vector 700, the instructions final execution cycle 16 is confirmed and the GR's are updated at 20.

In FIG. 4 a timing diagram of a second exemplary instruction is shown generally at 50. The completion of the instruction requires eight cycles, including first and second decode cycles 52, 54, execution setup cycle 56, first and second execution cycles 58, 60 and a put away cycle 62. AGI coverage is required at 66 from the cycle following the last decode cycle 54 to the end of the last execution cycle 60 whereupon the GR's are updated at 64. During the last decode cycle 54, the instruction updates of the GR's are determined at 68, the Instruction decode 90 feeds the decode vector 500 and the AGI queue 200. The instructions final decode cycle confirmation is made. After the last decode cycle 54 AGI coverage is provided at 70 by the decode vector 500 and 200 feeds the summary vector 600. After the previous AGI coverage 70, AGI is provided at 72 by the summary vector 600. During the execution setup cycle 56, at 74, the AGI queue 200 feeds the execution vector 700. After the execution setup cycle 56, AGI coverage is provided at 76 by the execution vector 700, the instructions final execution cycle 60 is confirmed and the GR's are updated at 64.

Once an AGI condition has been detected, that condition will continue to exist until the last instruction causing an interlock reaches the put away cycle (PA). During the put away cycle, the general register or the access register (AR) of interest is being written to the GR or AR array. The GR and AR arrays have bypass paths for new data. Therefore, the cycle in which the GR is updated is the first cycle to read the GR and obtain the updated contents. During this cycle, the updated GR is read and fed as into a latch, whose output is an input to the address adder. The address add cycle, AA, is permitted the next cycle.

Figure 6:
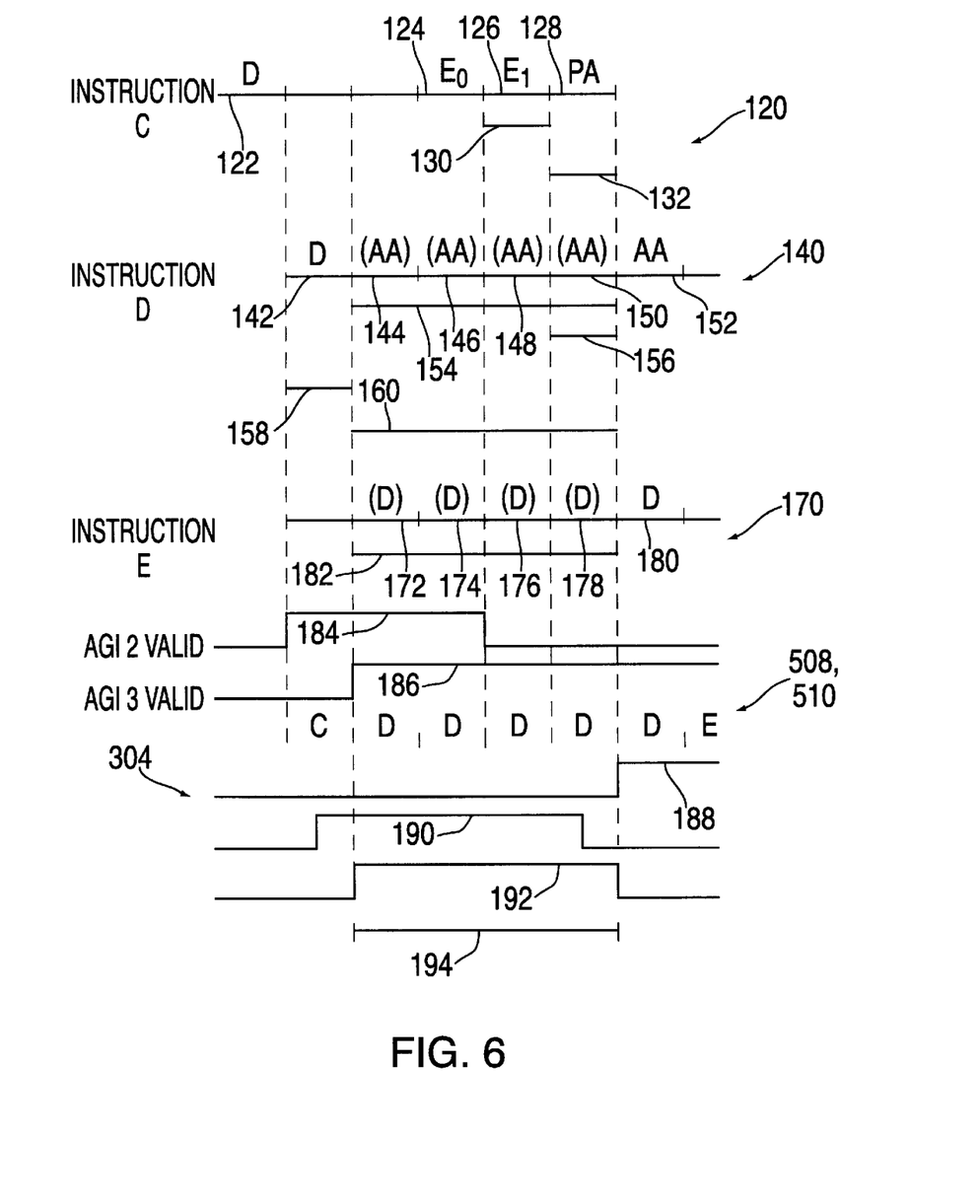
FIG. 6 is a timing diagram of normal Address Generation Interlock resolution of three exemplary instructions.

FIG. 6 a timing diagram of three exemplary instructions is shown generally at 120, 140, 170. The completion of the instruction C 120 requires six cycles, including a single decode cycle 122, an execution setup cycle 124 an execution cycle 126 and a put away cycle 128. At 130 during the execution cycle 126 the future GR content is being computed by the Execution Unit and being placed into the Execution Unit's output register. At 132 the put away cycle of instruction C there is the first cycle to read updated GR information. Instruction C, assigned to AGI-Q2, causes AGI for instruction D. Thus, the Address Add of instruction D from the cycle following the instruction D decode cycle 142 to the end of the put away cycle 128 of instruction C is blocked by the AGI caused by instruction C. The Address Add of instruction D 140 is not successful until after the completion of the put away cycle 128 of instruction C. The decode of instruction E 172, 174, 176, 178 is delayed until the Address Add is successful for instruction D at 152 and 180.

At 184 in FIG. 6 an AGIq-valid signal is high after instruction C decodes and remains so until after the E0 cycle of instruction C. At 186 a similar signal is shown corresponding to instruction D which is high after instruction D decodes and remains so until after the E0 cycle of instruction D. At 188 the control signal 304 permitting the general register write vector to participate in computing a summary of the AGI information is low during AGI and remains so until after instruction D has a successful address add whereupon the control signal 304 goes high. At 190 an AGI-hit signal goes high during instruction C address add and remains so until the AGI goes away. At 192 an AGI block decode signal is a latched copy of the AGI-hit signal 190 whereat the AGIq-3 write vector and new general register write vectors corresponding to instruction D are ignored.

While the present invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of detecting address generation interlock in a data processor having a pipeline in the form of a plurality of serially connected processing stages including an instruction decode stage, an address calculation stage following the decode stage, and an instruction execution stage following the address calculation stage, with each stage for processing an instruction where the pipeline shifts a series of instructions from stage to stage to perform pipeline processing on the series of instructions, and with the data processor including a set of N general registers which may be written to as a result of processing an instruction at the instruction execution stage in the pipeline or may be read from during the processing of an instruction at the address calculation stage in the pipeline, the method comprising:
   accumulating a plurality of vectors over a predefined number of processor clock cycles, with subsequent vectors corresponding to subsequent clock cycles;
   accumulating the status of one or more general registers in the plurality of vectors with the same bit location in each vector of the plurality of vectors corresponding to a particular general register;
   generating a list of pending general register updates from a logical combination of the plurality of vectors; and
   determining the existence of address generation interlock from the list of pending general register updates.

2. The method as set forth in claim 1 wherein accumulating the status of one or more general registers in the plurality of vectors with the same bit location in each vector of the plurality of vectors corresponding to a particular general register comprises:
   identifying which general registers are to be updated for the instruction being decoded;
   generating in an address generation interlock queue a list of instructions that may have pending general register updates;
   generating a decoded vector comprising pending general register updates for instructions recently decoded;
   generating a summary vector comprising pending general register updates for instructions awaiting execution; and
   generating an execution vector comprising pending general register updates for instructions in the execution stage.

3. The method as set forth in claim 2 further comprising combining an instruction that has been decoded but not yet executed with a first control signal permitting the general register write vector to participate in computing a summary of the address generation interlock information generating thereby the pending general register updates of outstanding instructions.

4. The method as set forth in claim 2 further comprising combining an instruction that has been decoded but not yet executed with a second control signal specifying which address generation interlock queue entry should be moved into the execution vector generating thereby a vector corresponding to the instruction that is in the execution cycle.

5. The method as set forth in claim 3 wherein combining an instruction that has been decoded but not yet executed with the first control signal comprises:
   logically AND-ing the instruction that has been decoded but not yet executed with the first control signal generating thereby vectors conditioned corresponding to instructions decoded but not yet executed; and
   logically OR-ing the conditioned vectors corresponding to instructions decoded but not yet executed.

6. The method as set forth in claim 4 wherein combining an instruction that has been decoded but not yet executed with the second control signal comprises multiplexing the instruction that has been decoded but not yet executed with the second control signal.

7. The method as set forth in claim 2 wherein generating a decoded vector comprising pending general register updates for instructions recently decode comprises:
   multiplexing the general register write vector, a signal operative when address generation interlock has been detected in the prior cycle and a new general register write vector; and
   logically AND-ing the new general register write vector, a signal validating the new general register write vector and a usage qualification of the new general register write vector.

8. The method as set forth in claim 2 wherein generating an execution vector comprising pending general register updates for instructions in the execution stage comprises:
   multiplexing the vector corresponding to the instruction that is in the execution cycle, an execution cycle confirmation and the instruction execution list general write vector; and
   logically AND-ing the instruction execution list general write vector and a validation of the instruction execution list general register write vector.

9. The method as set forth in claim 2 wherein generating a list of pending general register updates from a logical combination of the plurality of vectors comprises:
   logically OR-ing the pending general register updates for instructions recently decoded, the pending general register updates for instructions awaiting execution and the pending general register updates for instructions in the execution stage.

10. The method as set forth in claim 9 wherein determining the existence of address generation interlock from the list of pending general register updates comprises combining the list of pending general register updates with a general register base read address generating thereby the address generation interlock detection against base.

11. The method as set forth in claim 9 wherein determining the existence of address generation interlock from the list of pending general register updates comprises combining the list of pending general register updates with a general register index read address generating thereby the address generation interlock detection against index.

12. The method as set forth in claim 10 wherein the combining the list of pending general register updates with a general register base read address comprises multiplexing the list of pending general register updates with the general register base read address.

13. The method as set forth in claim 10 wherein the combining the list of pending general register updates with a general register index read address comprises multiplexing the list of pending general register updates with the general register index read address.

14. The method as set forth in claim 2 wherein providing an address generation interlock queue comprises providing a plurality of general register write vectors in signal communication with a plurality of multiplexers accepting as input thereto the general register write vector identifying which general register are to be updated for the instruction being decoded.

15. A system for detecting address generation interlock in a data processor having a pipeline in the form of a plurality of serially connected processing stages including an instruction decode stage, an address calculation stage following the decode stage, and an instruction execution stage following the address calculation stage, with each stage for processing an instruction where the pipeline shifts a series of instructions from stage to stage to perform pipeline processing on the series of instructions, and with the data processor including a set of N general registers which may be written to as a result of processing an instruction at the instruction execution stage in the pipeline or may be read from during the processing of an instruction at the decode stage in the pipeline, the system comprising:

a general register write vector originating from an instruction decode function in communication with an instruction register; the general register write vector identifying which general registers are to be updated for the instruction being decoded;

an address generation interlock queue comprising a list of instructions that may have pending general register updates and operative to accept as input thereto the general register write vector;

a decoded vector comprising pending general register updates for instructions recently decoded;

a summary vector comprising pending general register updates for instructions awaiting execution; and an execution vector comprising pending general register updates for instructions in the execution stage.

16. The system as set forth in claim 15 wherein the address generation interlock queue comprises:

a plurality of first multiplexers operative to accept as input thereto the decode general register write vector; and a plurality of latches containing the address generation interlock queue general register write vectors corresponding to instructions which have been decoded but not yet executed in signal communication with the plurality of first multiplexers and operative to provide as output the instructions decoded but not yet executed.

17. The system as set forth in claim 16 further comprising a first set of logical circuitry for generating the pending general register updates for instructions awaiting execution.

18. The system as set forth in claim 17 wherein the first set of logical circuitry comprises:

a first logical AND gate for combining an instruction that has been decoded but not yet executed with a control signal permitting the general register write vector, from the corresponding address generation interlock-queue entry, to participate in computing a summary of the address generation interlock information, generating thereby a set of qualified vectors; and a first logical OR gate operative to accept as input thereto the set of qualified vectors, generating thereby the pending general register updates for instructions awaiting execution.

19. The system as set forth in claim 16 further comprising a second set of logical circuitry for generating the pending general register updates for instructions in the execution stage.

20. The system as set forth in claim 19 wherein the second set of logical circuitry comprises:

a second multiplexer for combining the instructions decoded but not yet executed with a control signal specifying which address generation interlock-queue entry should be moved into the execution vector, generating thereby the vector corresponding to the instruction that is in the execution setup cycle;

a third multiplexer for combining the vector corresponding to the instruction that is in the execution setup cycle with a execution setup cycle confirmation, generating thereby an instruction execution list general write vector corresponding to the instruction in the execution stage of the pipeline; and a second logical AND gate for combining the instruction execution list general write vector with a validation of the instruction execution list general register write vector, generating thereby the pending general register updates for instructions in the execution unit.

21. The system as set forth in claim 16 further comprising a third set of logical circuitry for generating the pending general register updates for instructions recently decoded.

22. The system as set forth in claim 21 wherein the third set of logical circuitry comprises:

a fourth multiplexer for combining the general register write vector with a signal operative when the address generation interlock has been detected in the prior cycle generating thereby an output signal;

a new general register write vector latch operative to accept as input thereto the output signal and to provide as output a new general register write vector; and a third logical AND gate for combining a signal validating the new general register write vector, a usage qualification of the new general register write vector and the new general register write vector generating thereby the pending general register updates for instructions recently decoded.

23. The system as set forth in claim 16 further comprising a second logical OR gate for combing the pending general register updates for instructions recently decoded, the pending general register updates for instructions awaiting execution and the pending general register updates for instructions in the execution unit providing thereby as output all pending general register updates.

24. The system as set forth in claim 23 further comprising a fifth multiplexer for combining the list of all pending general register updates and a general register base read address.

25. The system as set forth in claim 23 further comprising a sixth multiplexer for combining the list of all pending general register updates and general register index read address.

* * * * *